INVENTOR.
RICHARD L. LEWIS.
BY
ATTORNEY.

United States Patent Office 3,526,437
Patented Sept. 1, 1970

3,526,437
HOLD-OFF VALVE
Richard L. Lewis, St. Joseph, Mich., assignor to The
Bendix Corporation, a corporation of Delaware
Continuation of application Ser. No. 557,142, June 13,
1966. This application May 12, 1969, Ser. No. 827,091
Int. Cl. B06t 13/00
U.S. Cl. 303—6
15 Claims

ABSTRACT OF THE DISCLOSURE

A pressure hold-off valve includes a housing having an inlet port and an outlet port communicating with an interior bore. An annular poppet valve is mounted for axial movement within the bore, and a valve head and stem projects from the annular poppet. The valve head is provided with a series of axially extending openings. The poppet carries a resilient member which interconnects the poppet and the openings in the valve head and is adapted to alternately cover and uncover the openings in the head so that fluid communication from the inlet to the outlet is permitted up to a predetermined inlet pressure and then terminated until a higher inlet pressure is reached. The higher pressure will cause the annular poppet to move downwardly in the bore to uncover a series of openings to meter fluid flow between the chambers up to a still higher inlet pressure. At the still higher inlet pressure, the annular poppet and valve head move further in the bore whereupon the fluid pressure flows freely through the hold-off device.

---

This application is a continuation of my copending application No. 557,142 filed on June 13, 1966, now abandoned.

This invention relates to a valve for holding off pressure communication to a fluid pressure device until pressure generated by a pressure source builds up to a predetermined value.

The pressure hold-off valve in accordance with my invention is especially designed for a brake system of an automotive vehicle which includes a pair of front disc brake assemblies and a pair of rear drum brake assemblies. In such a brake system, as may be readily realized by those skilled in the art which my invention relates, the actuation pressure required for actuation of the disc brake assemblies is substantially less than that required for actuation of the drum brake assemblies. This is due primarily to the return spring interconnecting the shoes of the drum brakes which must be overcome during an initial brake application. Therefore, only slight pressure is required to apply the disc brake while a sizeable pressure is required to overcome the return springs on the drum brakes before the brake shoes engage the brake drum. It is therefore an object of this invention to provide a brake system with a pressure hold-off valve capable of communicating a limited pressure to the disc brakes at first and thereafter terminate the delivery of fluid pressure to the disc brakes until a predetermined pressure is realized whereupon the valve will control fluid communication to the disc brakes.

It is a further object of this invention to provide a pressure hold-off valve which will, after the predetermined pressure is reached to activate the drum brakes, as aforementioned, meter fluid pressure to the front disc brakes until it is equal to the pressure in the pressure generating source whereupon the pressure hold-off valve effects essentially unrestricted communication between the pressure generating source and the front disc brakes.

It is still another object of the pressure hold-off valve to maintain open communication between the fluid pressure motor and the pressure generating source to permit handling of the flow of fluid caused by thermal contraction thereby preventing the creation of a vacuum in the fluid system.

Other objects of the invention will become apparent to those skilled in the art from the following description with reference to the drawings wherein.

Figure 1:
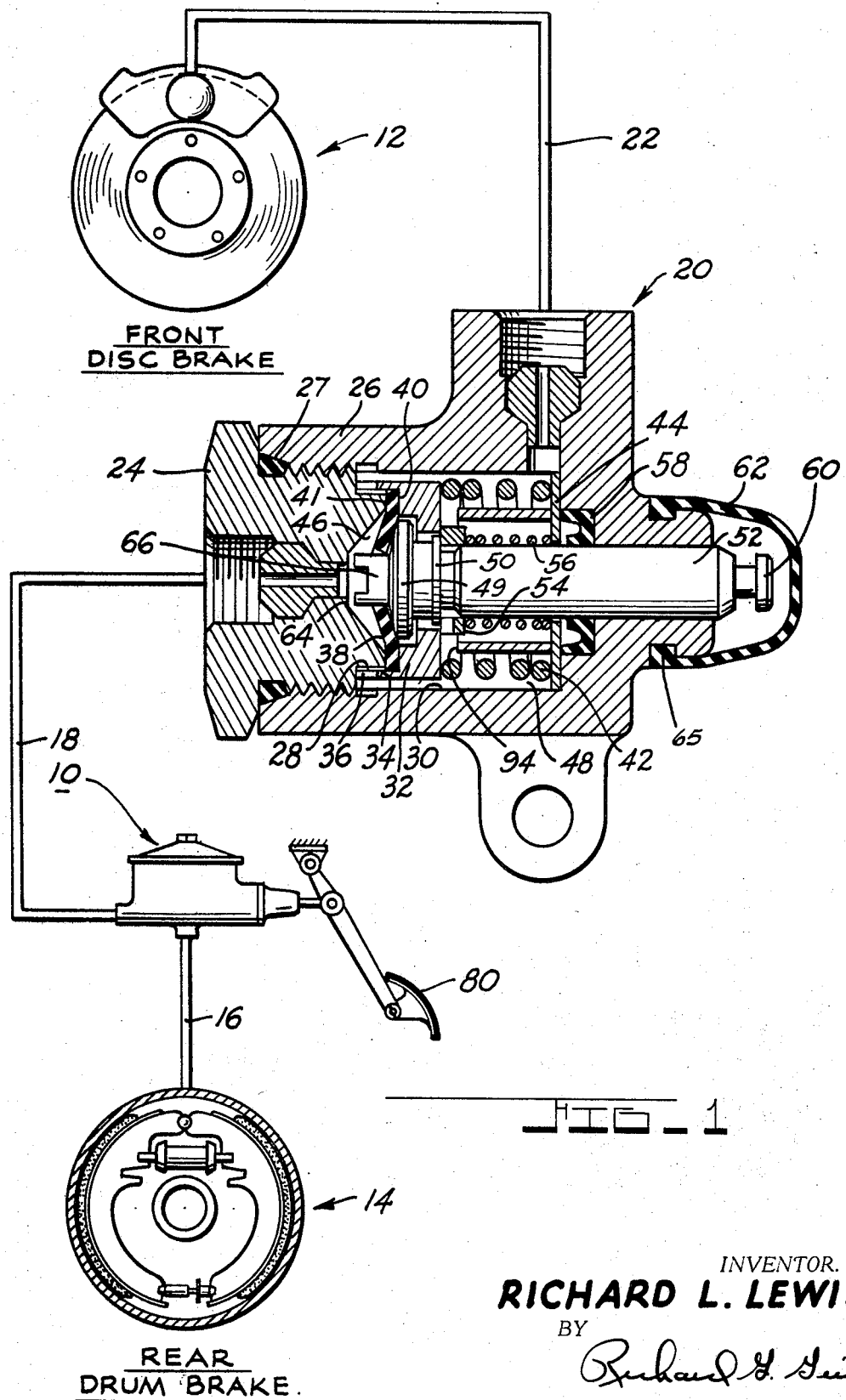
FIG. 1 is a schematic view of a brake system to which my invention may be applied showing a cross sectional detail of my pressure hold-off valve.

Referring now to FIG. 1, a master cylinder 10 is provided for actuating a pair of front disc brakes (one of which is shown, as at 12) and a pair of rear brakes (one of which is shown, as at 14). A conduit 16 connects one actuating chamber of the master cylinder with the wheel cylinders of the rear brakes, and a conduit 18 connects the other actuating chamber of the master cylinder with a pressure hold-off valve 20 which in turn is connected by a conduit 22 to the wheel cylinders of the front disc brakes 12.

An inlet fitting 24 is threadedly secured to one end of a valve housing 26 with a seal 27 compressed therebetween. The fitting 24 has a tubular projection 28 extending into a bore 30 of the housing 26. An annular valve poppet 32 having a collar 34 is slidably placed over the projection 28. This collar 34 is provided with radially spaced openings 36 adjacent its terminal edges, and a resilient member 38 is inserted in the collar 34 to bear against a shoulder 40 of the poppet 32. The tubular portion 28 of the fitting 24 is formed with a valve heat 41 to normally abut on the resilient member 38 and in turn position the poppet 32 within the bore 30 against the action of a spring 42 that is compressed between the poppet 32 and a spring bearing plate 44 located at the end of the bore 30. Thus, an inlet chamber 46 and an outlet chamber 48 are provided within the housing 26.

Within the annular poppet 32 a valve head 49 is slidably guided by means of a flange 50 on a valve stem 52 that is also slidably supported by a small diameter end of the bore 30 extending through the housing 26. About the stem 52, a spring retaining ring 54 is shown in a normal attitude where it is positioned to abut flange 50 and poppet 32 under the action of a spring 56 placed between ring 54 and the spring bearing plate 44. A seal 58 is provided at the right end of the bore 30 about the stem 52 in order to seal the outlet chamber 48. Furthermore, the stem 52 is provided with a button 60 on the exterior of the housing 26, and a boot 62 is snap fitted to a recess 65 in the housing over the projection of the stem 52 therethrough to prevent contaminates from entering the bore 30.

The inlet chamber 46 may be considered to be formed from a counterbore in the tubular portion 28 centrally of the valve seat 41, which counterbore is formed with a face 64 that cooperates with a projection 66 from the valve head 49 to limit the movement of the valve head and valve stem to the left, as seen in FIG. 1.

Figure 3:
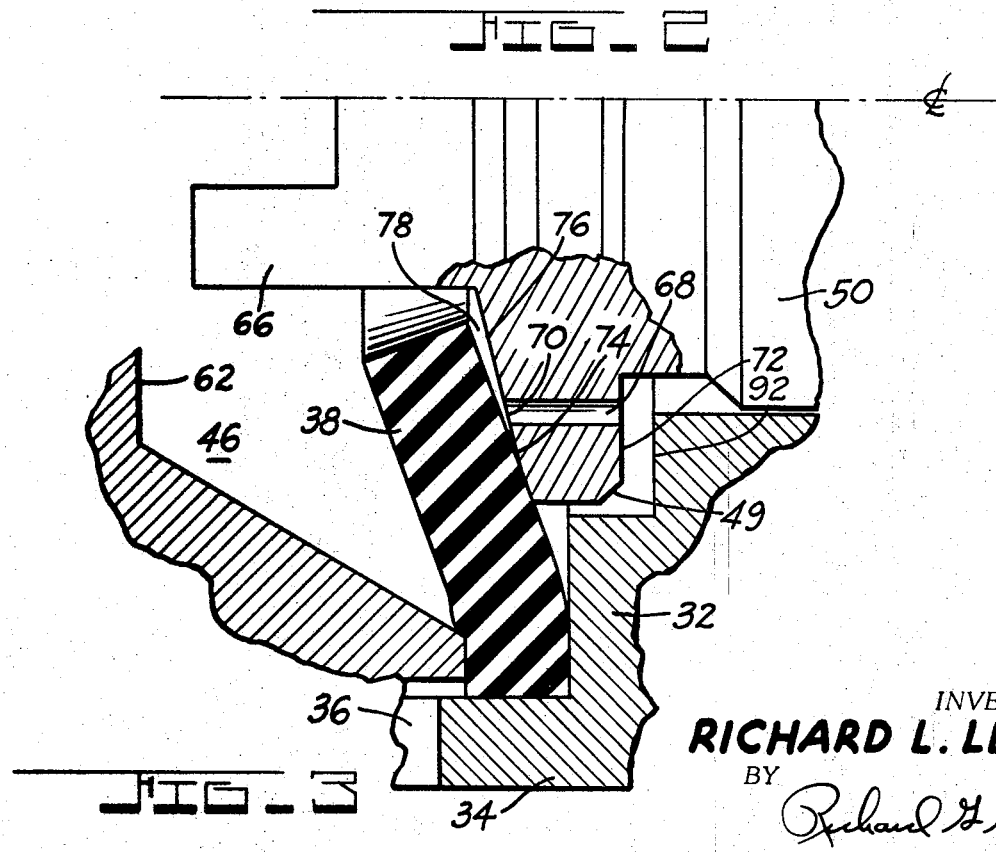
FIG. 3 is an enlarged cross sectional detail of a portion of my pressure hold-off valve.

With reference now to FIG. 3, the details of construction and of the action of the resilient member 38 and valve head 49 will be described. The valve head 49 is provided with a plurality of axial passages 68 extending from its front face 70 to its rear face 72. The front face 70 is formed to have an angled surface 74 from the outer edge of the opening 68 to the peripheral portion of the head 49, which in a preferred embodiment is on the order of 20°; whereas a surface 76 in the same preferred embodiment is angled at about 14° from the inner edge of the opening 68 to the central portion of the valve head 49 (toward the projection 66). Because of different angles for the surfaces 74 and 76 on the face 70 of the valve head 49, the check valve 38 will normally lie against the surface 74, when the valve head is projected by the spring 56 forwardly of the poppet 32. This will provide a fluid passage 78 between the surfaces 76 and the check valve 38 leading to the openings 68.

Figure 2:
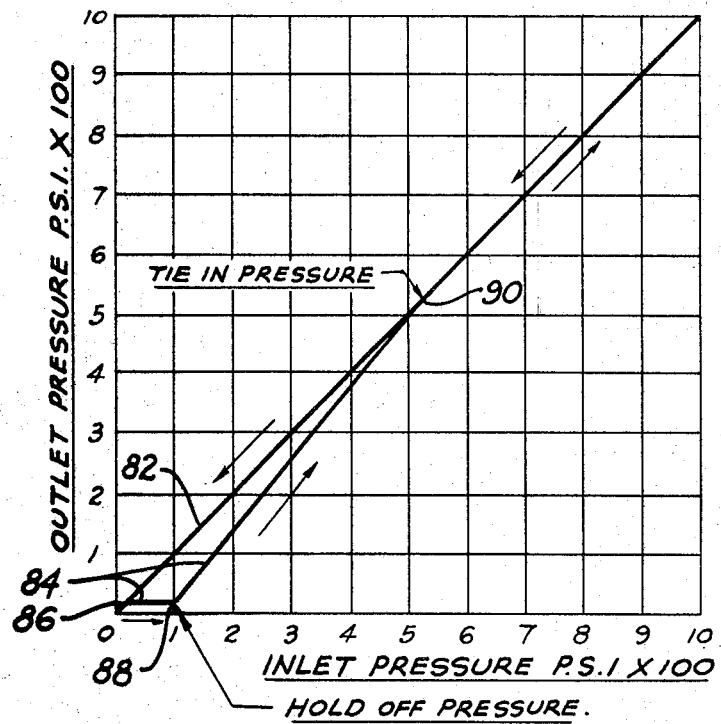
FIG. 2 is a graphical illustration depicting the operation of the pressure hold-off valve according to the principles of my invention.

In operation, an operator operates pedal 80 and a pressure is developed in the master cylinder 10. This pressure will be delivered via conduits 16 and 18 to the wheel brakes 14 and the hold-off valve 20, respectively. With reference now to FIG. 2, this will mean that the pressure in the pressure generating source will be developed along the slope of line 82 and the pressure to the valve 20 will be developed in accordance with line 84. Thus, at first, the pressure to the valve 20 will, because of the opening 68 and the passage 78, develop to a certain predetermined value 86 in the outlet chamber 48. At this predetermined pressure level the valve stem 53 will be projected to the right against the action of the spring 56, whereupon the check valve 38 will become flush with the surface 76 and becomes slightly spaced from the surface 74. At this point, as illustrated by 86 in FIG. 2, pressure will no longer pass through the valve 20 from the inlet chamber 46 to the outlet chamber 48 until the inlet pressure reaches approximately 100 p.s.i., as represented by the point 88 in FIG. 2. Above 100 p.s.i. the pressure in the inlet chamber 46 acting within the area prescribed by the annular valve seat 41 will overcome the spring 42 and start the poppet 32 to move to the right.

Movement of the poppet 32 to the right will uncover a slightly greater area for the pressure of the inlet chamber 46 to act upon and, at the same time, begin to gradually open a passage between the seat 41 and valve 38 to meter fluid flow to the chamber 48 via a series of radial openings 36 in the collar 34. This metering of the fluid from the inlet chamber 46 to the outlet chamber 48 will continue until the pressure is equalized between the chambers 46 and 48. At this time the lines 84 and 82 of FIG. 2 come together at a tie in pressure point 90 and proceed along the slope of line 82 thereafter. This means that the valve 20 is no longer effective to control development of a different pressure in the disc brakes than that created by the master cylinder 10.

In the system built to the principles of my invention, it has been found that there are two initial actions that the valve 20 may have when pressure is first applied:

(1) If flow is very small, the valve will pass fluid without any movement of any of the parts until the pressure reaches a predetermined low pressure (in the system, built, approximately 15 p.s.i.), then the stem 52 will shift to the right until it bottoms on a shoulder or stop 92 of the poppet 32. This motion permits the check valve 38 to close the holes 68 in the valve head 48. In this arrangement the fluid pressure is developed essentially as aforedescribed, i.e., it begins at zero, develops to the point 86 and then stays at this point until the inlet pressure reaches the magnitude represented by the point 88 whereupon it begins to rise on a slope until it reaches the tie-in pressure point 90 whereupon it joins the slope of the master cylinder pressure represented by the line 82.

(2) If a faster brake application is made, the check valve 38 will be sucked down against the face 76 and will close the holes 68 in the valve head 48. Then at approximately 15 p.s.i., as represented by the point 86 in FIG. 2, the stem 52 will shift to the right until bottom as described above, so that the line 84 will represent the slope for the ratio of master cylinder pressure to valve outlet pressure for the disc brakes 12.

The button 60 is provided on the valve stem 52 in order to bleed the hydraulic brake system during the normal service of same; i.e., a mechanic can depress the button 60 to open the holes 68 and permit bleeding.

Finally, it should be noted that when pressure is applied to the inlet port in the fitting 24, this pressure against the area within the confines of the seat 41 is opposed by two spring forces (springs 44 and 56), seal friction and the pressure in the outlet chamber 48 applied to an area calculated by subtracting the area of the stem 52 from the area within the confines of the seat 41. Thus, as inlet pressure increases, outlet pressure increases at a greater rate until inlet pressure equals the outlet pressure at the point 90, as seen in FIG. 2. Then, at higher pressures the valve 20 stands open at the check valve 38 and the poppet 32 bottoms on the stop 94.

Furthermore, when the inlet pressure is reduced, outlet pressure reduces equally. In this regard, it should be noted that fluid passes through the check valve 38 and by the seat 41 until the tie-in pressure point 90 is reached. Then fluid passes through the openings 68 into the pagsage 78 and thence to the master cylinder 10.

As the pressure drops below approximately 15 p.s.i., as represented by the point 86 in FIG. 2, the spring 56 shifts the stem 52 to the left and holds the check valve 38 open again so that the system can breathe for thermal contractions.

As can readily be seen, the above objects are achieved by the invention disclosed herein. It is our intention to include within the scope of the following claims all equivalent applications of the inventions whereby the same or substantially the same results may be obtained.

What is claimed is:

1. A means to regulate the delivery of fluid pressure, said means comprising:
   a first valve means adapted to open communication of fluid pressure upon the obtainment of a predetermined pressure, said first valve means having a spring biased annular valve poppet; and
   a second valve means operatively connected to said first valve means to by-pass said fluid pressure up to a lesser predetermined pressure, with said second valve means having a valve head with a valve stem mounted through the opening in the annular valve poppet and biased by a spring to deform a resilient valve seat carried by said annular valve poppet away from openings through the valve head to permit limited fluid flow through the valve head and annular valve poppet until fluid pressure forces the stem to assume a position wherein the resilient seat is flush on the openings through the valve head so that flow therethrough is terminated until the fluid pressure over the entire area of the annular valve poppet and valve head sealed with respect thereto by said resilient valve seat opens said first valve to meter fluid pressure through the means regulating its delivery.

2. A pressure hold-off valve comprising:
   a housing having a bore therein with an outlet port in fluid communication therewith, said bore extending through said housing;
   a valve means slidably arranged in said bore including a pressure responsive annular poppet with an annular resilient means having valve seat areas on its front and rear faces and mounted on one side of said poppet to at least partially cover the annular poppet opening, a valve head slidably mounted within the annular poppet, said valve head having openings therethrough and being arranged to be adjacent the rear face of said annular resilient means, and a valve stem operatively connected to the valve head and slidably carried by the bore through said housing located on the other side of said annular poppet from said resilient means;
   a means to establish a flow path into said bore toward said valve means including a fitting assembled to the housing in said bore at the other end of said housing from that which slidably carries said valve stem, said fitting having a valve seat projecting towards said the front face of said annular resilient means;

a first spring means biasing said annular poppet to a position where the front face of said resilient means abuts said valve seat adjacent the radial extremities of said resilient means;

a second spring means of lesser spring load than said first spring means, said second spring means being arranged between said housing and said valve stem to bias said valve head to deform the central region of said resilient means whereby a fluid passageway exists between said resilient means and the openings through said valve head in the normal released condition of said pressure hold-off valve and until a fluid pressure is created on said valve head and valve stem to move the valve head with relation to the poppet until the rear face of the resilient means is flush over the entire surface of the underlying valve head whereupon the openings through the valve head are closed so that fluid pressure may only thereafter be communicated through the pressure hold-off valve by overcoming the first spring means to remove the resilient means from the valve seat of said fitting by forcing the annular poppet away from the seat.

3. A pressure hold-off valve according to claim 2 wherein the valve head is further characterized as having a surface whose face is formed at one angle from the edge of the openings therethrough to the outermost periphery thereof and at a lesser angle from the inner edge of the openings to the innermost area of the surface.

4. A pressure hold-off valve according to claim 2, wherein said valve stem and said valve head are formed as a unitary piece and the valve stem is provided with a means projecting externally of the housing to manually project the valve head from the annular poppet so as to provide a greater area fluid passage for servicing the fluid pressure system.

5. A pressure hold-off valve comprising:
a housing having a bore therein with an outlet port in fluid communication therewith, said bore extending through said housing:
a valve means slidably arranged in said bore including,
  an annular poppet,
  a valve head having a valve stem extending through an opening in the annular poppet, and
  a resilient, annular member having an opening of lesser diameter than the opening of said annular poppet, said resilient member operatively connecting said annular poppet and said valve head;
a means for establishing a flow path into said bore including a fitting assembled to said housing within said bore and positioning said valve means within said housing, said fitting having a passage to provide an inlet port for said bore, and further having a valve seat arranged to support said annular poppet and cooperate with the radial extremities of said resilient annular member to control communication of said inlet port to said outlet port;
a first spring in said bore for biasing said annular poppet and said resilient annular member against said valve seat, said spring being compressed between a spring bearing plate fixed in said bore against said housing and said annular poppet; and
a second spring of predetermined lesser spring load than said first spring, said second spring operatively arranged between said spring bearing plate and said stem for said valve head so as to bias said valve head against said resilient annular member to deform said resilient annular member in which deformed condition fluid communication is permitted from said inlet port to said outlet port until fluid inlet pressure forces said valve stem and said valve head to a position where said resilient annular member is flush against a surface of the valve head immediately underlying same.

6. A pressure hold-off valve according to claim 5 wherein said valve head is further characterized as having a plurality of axially extending openings and the surface immediately underlying the resilient annular member is formed with a greater angle between the openings and the peripheral portion of the valve head than the angle between the openings in the innermost portion of the valve head.

7. A pressure hold-off valve according to claim 6 wherein said valve seat is sized to permit the central deformation of the resilient annular member while limiting the deformation by having a bottom face spaced a limited distance from a projection of the valve head that extends through the central opening of the resilient means.

8. A pressure hold-off valve according to claim 7 and further comprising seal means at each end of the bore for respectively sealing the housng about the valve stem and the fitting.

9. A pressure hold-off valve according to claim 6 wherein said fitting is provided with a threaded surface that mates with internal threads of the housing about the bore so that the fitting may be adjustably positioned within the bore and the spring rate of the first spring varied in accordance with its position.

10. A pressure hold-off device comprising:
a housing having a bore therein with means for establishing a flow path into and out of said bore;
valve means in said bore normally biased to create an inlet chamber on one side of said valve means and an outlet chamber on the other side;
said valve means including a first valve member, a second valve member operatively connected to said first valve member, and a check valve means operatively connected to each of said first and second valve members;
said first and second valve members being coaxial and being arranged for slidable movement in said bore and for relative slidable movement therebetween;
said check valve means being responsive to said relative slidable movement between said first and second valve members such that fluid communication from said inlet chamber to said outlet chamber is permitted up to a predetermined inlet pressure and then terminated until a higher inlet pressure is reached whereupon said first and second valve member move together to meter fluid flow between the chambers up to a still higher inlet pressure whereupon communication is fully established through the hold-off device.

11. A pressure hold-off device according to claim 10 and further comprising stop means on said first valve member for limiting the relative slidable movement between said first valve member and said second valve member.

12. A pressure hold-off device according to claim 11 and further comprising a valve seat to position said first valve member with respect to said second valve member such that said check valve means is normally held open by said second valve member in the released attitude of said pressure hold-off device.

13. A pressure hold-off device according to claim 10 and further comprising a first spring means operatively connected to said first valve member and a second spring means of lesser load than said first spring means operatively connected to said second valve member to create the biasing force on said first valve member and said second valve member.

14. A pressure hold-off device according to claim 10 and further comprising a stop located between said housing and said first valve member to limit the travel of the latter within the bore.

15. A pressure hold-off valve comprising:
a housing having an inlet, an outlet, and a bore communicating the inlet with the outlet;
a valve seat area on said housing circumscribing said inlet;
first and second valve means arranged for slidable movement in said bore and for relative slidable movement therebetween disposed between the inlet and outlet to divide the bore into an inlet chamber and an outlet chamber;
said first valve means having a central opening extending therethrough and having an outer circumferential surface spaced from the housing to define an annular passage therebetween to communicate the inlet chamber with the outlet chamber;
said second valve means having a valve stem extending through said opening to define a passage between the stem and the first valve means extending through the latter to communicate the inlet chamber with the outlet chamber;
a first spring in said bore biasing said first valve member into engagement with said valve seat;
a seond spring in said bore biasing said second valve means into the inlet chamber; and
means preventing fluid flow through the last-named passage in response to pressure in said bore sufficient to overcome the bias of said second spring to drive the second valve member toward the outlet chamber;
said last-named means interrupting fluid communication between the inlet and outlet chambers up to a second pressure sufficient to overcome the bias of said first spring means to drive said first valve means from said seat whereupon fluid communication is permitted between the inlet and outlet chambers through said annular passage.

References Cited

UNITED STATES PATENTS

| | | | |
|---|---|---|---|
| 2,677,939 | 5/1954 | Clute | 137—512.1 X |
| 2,734,525 | 2/1956 | Rausch | 137—517 X |
| 2,861,589 | 11/1958 | Ostwald | 137—508 X |
| 3,104,676 | 9/1963 | Steer | 137—543 X |
| 3,278,241 | 10/1966 | Stelzer. | |
| 3,375,852 | 4/1968 | Milster. | |

WILLIAM F. O'DEA, Primary Examiner

D. J. ZOBKIW, Assistant Examiner

U.S. Cl. X.R.

60—54.5; 137—512.3, 517